May 24, 1932.    W. H. McCALL    1,859,927
ELECTRIC HEAT CONTROL
Filed Oct. 29, 1929
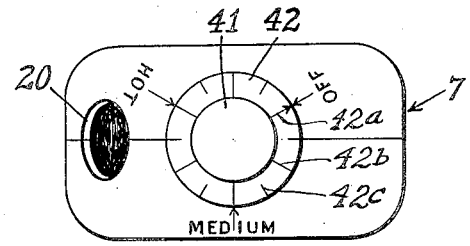
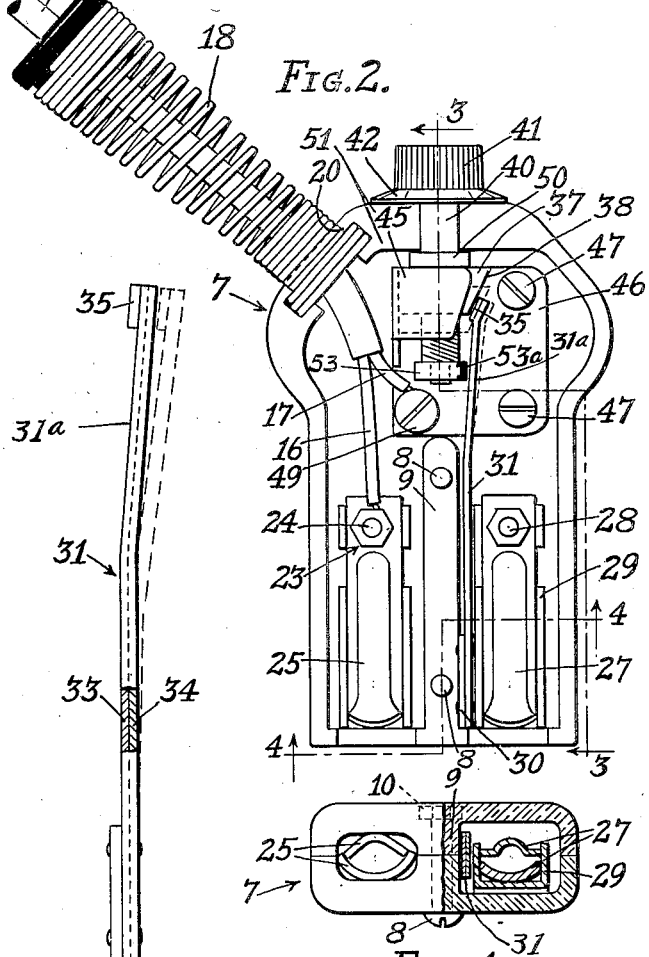
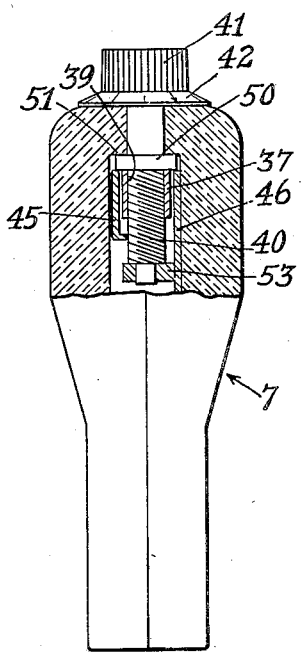
INVENTOR.
William H. McCall,
BY
Robt. D. Pearson
ATTORNEY.

Patented May 24, 1932

1,859,927

UNITED STATES PATENT OFFICE

WILLIAM H. McCALL, OF GLENDALE, CALIFORNIA, ASSIGNOR TO HEAT-O-MATIC ELECTRICAL DEVICE CORPORATION LTD., OF LOS ANGELES, CALIFORNIA, A CORPORATION OF CALIFORNIA

ELECTRIC HEAT CONTROL

Application filed October 29, 1929. Serial No. 403,255.

This invention relates to a thermostatic control of the heat supplied by an electric current.

The invention, as shown in the accompanying drawings, may be applicable to many electrical heating appliances.

Among the objects of the invention are to provide a convenient means to adjust manually the thermostatic portion of the device to maintain the desired amount of heat in the sad iron or other appliance in combination with which the invention is used.

Other objects of the invention are to improve upon electrical devices of this class with respect to simplicity and compactness of construction, efficiency of operation without waste of the electric current, and durability of the appliance as a whole.

In the illustrated embodiment of the invention, the manually adjustable element is so arranged with respect to the electric conductor that these parts of the appliance will operate harmoniously without one of them interfering with the operation of the other.

Other objects and advantages may hereinafter appear.

Referring to the accompanying drawings which illustrate a preferred embodiment of the invention, wherein it is adapted to be connected with an electric sad iron.

Fig. 1 is an end view of the appliance looking at the end thereof with which the electric conductors are connected.

Fig. 2 is an inside plan view of the base and contained parts, with the cap removed.

Fig. 3 is a view partly in section and partly in side elevation of the appliance on line 3—3 of Fig. 2.

Fig. 4 is a partial cross section and partial end view on line 4—4 of Fig. 2.

Fig. 5 is a side elevation of the thermostat member, a portion of said member being sectioned to show more clearly the bi-metallic construction thereof.

Referring in detail to the drawings, the electric connections are enclosed within a two part casing or housing 7 of bakelite or other insulating material, one of the separable halves of said casing being shown in Fig. 2. These two halves of the casing are held together in any well known manner as by means of screws 8 molded into a rib 9 and screwing into a nut 10, said nut being indicated in dotted lines in Fig. 4 where it is shown embedded in the opposite half of the casing to that shown in Fig. 2.

The cord 15 comprises the two conductors 16 and 17, said cord being protected by a cord holding spring 18. Said cord 17 is not connected axially with the casing 7, but is led into an opening 20 in said casing in a diagonal manner, and in such a way as to leave unobstructed the adjacent central end portion of the casing.

The conductor 16 is secured to a terminal 23 provided with a binding post 24 which may be of well known construction. Said terminal 23 is in direct electrical contact with the cooperating spring clips 25 between which are telescoped the terminal posts (not shown) of the sad iron element. At the other side of the appliance are located the terminal clips 27 which, by means of a binding post 28, are maintained in electric connection with a base plate 29. Said base plate 29, on the side thereof next to the center of the appliance, is provided with an upstanding flange 30 to which is riveted or otherwise secured a thermostatic member or arm 31.

The thermostatic member is illustrated by way of example, in a detailed manner in Fig. 5, being shown in said view as consisting of a brass strip 33 combined with a steel strip 34, and having at its free end a contact point 35 secured thereto.

With said thermostatic member cooperates an adjustable terminal 37 having a bevelled contact face 38 which cooperates with the contact point 35 of the thermostatic member. Said terminal 37 is preferably formed as a slidable block having therethrough a screw threaded bore 39 into which is screwed the stem 40 of a control screw shaft which extends axially with respect to the casing 7 and projects from one end of said casing having fixed to its projecting end a manually rotatable knob 41. Said knob 41 is preferably milled and provided with an outwardly extending base flange 42 upon which is inscribed an indicating arrow 42a which cooperates with the arrows on the casing marked "Hot" "Off" and "Medium" to indicate the degrees of heat supplied by the heating element. Additional marks 42b and 42c may be supplied on flange 42 to indicate intermediate degrees of heat.

The adjustable terminal 37 is formed as a block which fits slidably within an upwardly extending guide or flange portion 45 with which the base plate 46 is provided, said base plate 46 being held in place by the screws 47 and the conductor 17 being electrically connected with said base plate by means of the terminal screw 49. Said control or adjusting stem 40 has formed thereon or secured thereto a collar or radially projecting flange 50 which fits in between the guide flange 45 and the shoulder portion 51 of the casing through which said stem 40 extends. At the inner end of said stem 40 the base plate 46 is provided with an upstanding flange or ear 53 which supports the inner end of said stem 40 and within which that end of the stem has a working fit. Collar 50, shoulder 51 and ear 53 provide means which prevent lengthwise movement of the stem 40 while permitting rotation thereof.

The thermostatic member 31 and adjustable terminal 37 are so arranged with relation to each other that, when said terminal 37 is properly adjusted, the proper amount of current is supplied to the sad iron, or other electrically heated implement, to maintain such implement at the desired degree of heat. When the heat falls below the desired amount the thermostatic member will automatically move its contact point 35 into contact with beveled face 38 of the adjustable terminal 37, and as soon as the heat exceeds the predetermined amount said thermostatic member 31 will automatically withdraw its contact point 35 from the face 38 of the contact 37 thus breaking the circuit and allowing the electrically heated element to cool until the thermostatic member again automatically restores the electric connection.

Normally the contact point 35 of the thermostatic arm 31 will be in engagement with the contact face 38 of the adjustable terminal 37, but when the appliance is connected with a source of electric current supply, heat will begin to be supplied by conduction to the thermostat member 31 and, when such heat exceeds the predetermined temperature for which the control stem 40 has been set, the contact point 35 of the thermostatic member will be moved away from the contact face 38. The thermostatic arm or member 31 is provided with a laterally deflected portion 31a for a considerable distance from its free end, thus to adapt it to cooperate properly with the terminal 37 when said terminal is advanced and retracted in a direction parallel to the body portion of the thermostatic arm 31. The upstanding flange or ear 53 which supports the inner end of stem 40 is adapted also to act as a stop to limit the movement of the thermostatic arm 31 toward the adjustable terminal 37. This arrangement makes it possible to retract said terminal 37 sufficiently to completely cut off the electric current even while the appliance is connected with a source of electric current supply. The indicating marks shown in Fig. 1 are so arranged that when the movable terminal 37 is retracted to this extent the arrow 42a points to the "Off" position. The post 53 is provided with insulating material 53a against which the thermostatic arm rests at such time while the free end thereof is out of contact with the movable terminal 37. The use of this insulated stop means for the thermostatic arm makes it unnecessary to adjust with any great precision the position which said arm assumes when in the cold condition. It is desirable that the rotatable adjusting knob 41 be located at one end of the elongated casing upon which it is mounted so that said knob may readily be adjusted with one hand while the other hand grasps said casing. With said knob thus located and with the thermostatic arm 31 extending lengthwise of the casing, it is necessary to provide the free end portion of said arm 31 with a deflected part in order that the adjustable contact 37 will properly cooperate with the thermostat and will be capable of adjustment toward and from the anchored portion of the thermostat.

Claims:

1. In an adjustable appliance for thermostatically controlling the supply of electric current, an elongated casing of insulating material, a thermostatic control device within said casing adapted to be connected at one end of the casing with an appliance to be electrically heated, a manually operable adjusting member for said thermostatic device projecting externally and axially from the other end of the casing, and a cord holding device extending diagonally with relation to the axis of the casing and connected therewith in spaced relation to said adjusting member.

2. In an adjustable appliance for thermostatically controlling the supply of electric current, an elongated casing of insulating material, a screw threaded stem located within said casing and projecting from one end thereof in the direction of the length of said casing, means secured to the projecting portion of said stem to rotate the same, means to prevent lengthwise movement of said stem while permitting rotation thereof, an electric terminal adjustable lengthwise of said casing and having a screw threaded engagement with said stem, guiding means for said terminal to cause it to be non-rotatably engaged by said stem, a bi-metallic thermostatic arm secured to said casing at one end and having its free end diagonally deflected with respect to the length of said casing, and in an operative relation to said adjustable terminal, and conductors to complete an electric circuit through said thermostatic arm and adjustable terminal.

3. In an adjustable appliance adapted for thermostatically controlling the supply of electric current to sad irons, a casing of insulating material, electrical connections in said casing, and a thermostatic arm of the bi-metallic laterally deflectable type to control the supply of current through said connections, said thermostatic arm being anchored at one end and being bent to deflect a portion thereof at its free end, and a movable contact to cooperate with the free end portion of said arm, said movable contact being in approximate axial alinement with the anchored portion of said arm and being adjustable toward and from the anchorage of said arm.

4. In an adjustable appliance adapted for thermostatically controlling the supply of electric current to sad irons, an elongated casing of insulated material, electrical connections in said casing, a thermostatic arm which extends lengthwise of said casing and which is of the laterally deflectable bi-metallic type to control the supply of current through said connections, said thermostatic arm having a contact mounted upon one side of its free end portion, an adjustable contact which is adapted to cooperate with the contact carried by said arm, and manually operable means to adjust said movable contact lengthwise of the casing, said adjustable contact having a contact-making face which is inclined with respect to the length of the casing.

5. In an adjustable appliance for thermostatically controlling the supply of electric current, a thermostat proper consisting of an arm which at times forms part of the electric circuit and which is positioned at all times to have its temperature affected by heat from an element which is heated by said electric circuit, said thermostatic arm being of the bi-metallic type to cause varying degrees of heat to vary the lateral position thereof, and a terminal adjustable back and forth along a substantially straight path, said terminal having a contact making face which is inclined with respect to the path of movement of the terminal and which is adapted to be engaged by said thermostatic arm when the heat rises to a predetermined degree.

In testimony whereof I hereunto affix my signature.

WILLIAM H. McCALL.